May 5, 1931.　　　　B. M. SHIPLEY　　　　1,803,812
CASH REGISTER
Original Filed Jan. 14, 1924　　4 Sheets-Sheet 1

FIG. 1

Inventor
Bernis M. Shipley
By Carl Beust
Henry E. Stauffer
His Attorneys May 5, 1931.  B. M. SHIPLEY  1,803,812
CASH REGISTER
Original Filed Jan. 14, 1924   4 Sheets-Sheet 2

Inventor
Bernis M. Shipley
By
His Attorneys

May 5, 1931.  B. M. SHIPLEY  1,803,812
CASH REGISTER
Original Filed Jan. 14, 1924  4 Sheets-Sheet 3

Inventor
Bernis M. Shipley
By Carl Beust
Henry E. Stauffer
His Attorneys

Patented May 5, 1931

1,803,812

UNITED STATES PATENT OFFICE

BERNIS M. SHIPLEY, OF DAYTON, OHIO, ASSIGNOR TO THE NATIONAL CASH REGISTER COMPANY, OF DAYTON, OHIO, A CORPORATION OF MARYLAND

CASH REGISTER

Original application filed January 14, 1924, Serial No. 687,305. Divided and this application filed April 9, 1927. Serial No. 182,371.

This invention relates to cash registers and the like machines, and more particularly to money receptacles and controlling mechanisms therefor.

The invention is shown applied to a machine of the type described and illustrated in application for Letters Patent of the United, Serial Number 687,305, filed January 14, 1924, by Bernis M. Shipley, of which the subject matter of this invention constitutes a division.

One of the objects of this invention is to provide a cash drawer and means for normally holding the cash drawer in an inaccessible position.

Another object is to provide mechanism for controlling the cash drawer, to render it accessible on certain operations, and inaccessible on certain other operations.

A further object is to provide a single cash drawer and releasing means therefor, which releasing means is rendered active to release the drawer when certain keys are depressed, and rendered inactive to prevent the release of the cash drawer, when the other keys are depressed.

Another object is to provide a drawer releasing mechanism, in a machine capable of accumulating single items and a plurality of items of multiple item transactions and printing the total thereof, which releasing mechanism is rendered inactive when a multiple item transaction key is depressed, and rendered active when a single item key is depressed, or when the total control device is shifted from the "add" position to the multiple item transaction "total" position.

With these and incidental objects in view, the invention consists of certain novel features of construction and combinations of parts, the essential elements of which are set forth in appended claims and a preferred form or embodiment of which is hereinafter described with reference to the drawings which accompany and form part of this specification.

General description

The machine to which the present invention is shown applied, as illustrated and described in the application cited, consists, in general, of a plurality of manipulative keys for entering the amounts to be registered, indicating mechanism for indicating the amounts registered and the totals thereof, a plurality of totalizers for accumulating the various items and transactions, and printing means, controlled to issue a receipt, upon which is printed either a single item, or a plurality of items together with the total thereof. A normally inaccessible money receptacle is provided. The transaction keys, clerks' keys and a total control lever are provided for controlling the various elements just enumerated.

Only such of the above mechanism as is thought necessary for a full understanding of the present invention is shown and described herein, and reference may be had to the Shipley application cited, for a full and complete understanding of the machine.

The machine, to which the present invention is shown applied, is adapted for use in places of business where it is desired to render the cash drawer inaccessible when registering the items of a multiple-item transaction, to render the cash drawer accessible when the total of the items of a multiple-item transaction is taken, and also to render the cash drawer accessible on each transaction comprising a single item.

Keyboard

The keyboard of the present machine is the same as that shown and described in the above mentioned application, to which reference is hereby made for a full and clear description. Only a general description of the keyboard will be given herein.

Figure 3:
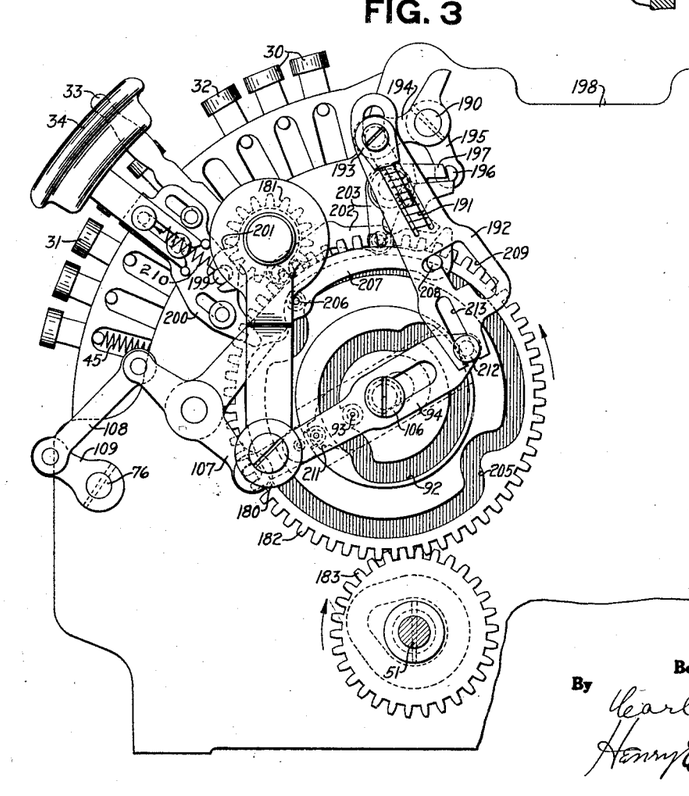
Fig. 3 is an elevation of the right hand end of the machine.

The keyboard includes four banks of amount keys, not shown, a bank of clerks' keys, also not shown, a bank of transaction keys 30 and 31, (Figs. 1 and 3), a key 32 for releasing said transaction keys, a total control lever 33, (Fig. 5), for controlling the machine on total-taking and sub-total taking operations, and a starting bar 34, (Fig. 3).

The transaction keys 30 and 31 (Fig. 1) and the transaction key release 32 are mounted in a common frame 35, supported in the machine by cross rods 36 and 37. The keys 30 are used in entering a transaction consisting of two or more items and compel the totals thereof to be printed. This is known herein as a multiple-item transaction. The keys 31 are used in entering a transaction comprising a single item, known herein as a single-item transaction.

The keys 30 and 31 (Fig. 1), when depressed, are so held by the locking detent 38, supported at its upper end by an arm 39 and at its lower end by an arm 40. Each of the keys 30 and 31, has a pin 41 mounted therein, which co-operates with a hook 42 on the detent 38. After a key 30 or 31 has been depressed, the detent 38 is returned to its normal position by a spring 43, at which time the hook 42 engages the pin 41 and retains the key in its depressed position.

The transaction keys 30 and 31 (Fig. 1) are not released automatically during an operation of the machine. These keys can be released by depressing another one of the transaction keys 30 or 31, or by depressing the transaction key release key 32. The pin 41 of the transaction key release key 32 co-operates with an angular lug 44 on the detent 38, to move the detent down and release any depressed transaction key. There is no hook 42 opposite the key pin 41 of the transaction key release key 32 and, therefore, this key will return immediately to its outward or normal position. The transaction keys 30 and 31 are held in their normal positions by springs 45 (Fig. 3) there being one spring associated with each key.

Transaction differential mechanism

Associated with the bank of transaction keys is the differential mechanism (Fig. 1) provided for adjusting the printing mechanism and indicators, for selecting transaction totalizers and transaction special counters, and for controlling the various elements for registering single-item and multiple-item transactions.

The differential mechanism includes a differentially movable arm 50 (Fig. 1) pivoted on a stud 49. This arm is given a variable movement on each operation of the machine. To drive the arm 50 a main drive shaft 51 has rigid thereon a pair of cams 52, which co-operate with two rollers 53, carried by a Y-shaped lever 54. The lever 54 is pivoted on an irregularly shaped support plate or hanger 55, supported in the machine by two rods 56. At its upper end the lever 54 is connected by a link 57 to a driving segment 58, pivotally mounted on the stud 49, carried by the hanger 55. The cams 52 receive one clockwise rotation on each operation of the machine, which, through the mechanism just described, rocks the segment 58 first clockwise an invariable extent and then counter-clockwise to its normal position. The arm 50 is connected to the segment 58 by a latch 59, the foot of which engages a shoulder on the segment 58, and is held in this position by a spring 60. The latch 59 is supported on the arm 50 by a link 61, and a bell crank 62. As the segment 58 is moved up, the arm 50 is carried with it until an end 63 of the bell crank 62 contacts the end of the depressed key, whereupon the bell crank is rocked counter-clockwise, disengaging the foot of the latch 59 from the shoulder on the segment 58, and engaging a nose 64 on the latch with a notch 65 in a bar 66, supported at its upper end by the hanger 55 and at its lower end by one of the rods 56. The segment 58 continues its regular excursion and on its return movement, as the shoulder thereon arrives opposite the foot of the latch, the spring 60 acts to withdraw the nose 64 from the notched bar 66 and reengage the latch 59 with the segment 58. At this time a stud 67 on the arm 50 is engaged by a surface 68 on the segment 58, which returns the arm 50 to its normal position.

Transaction key locking mechanism

Figure 5:
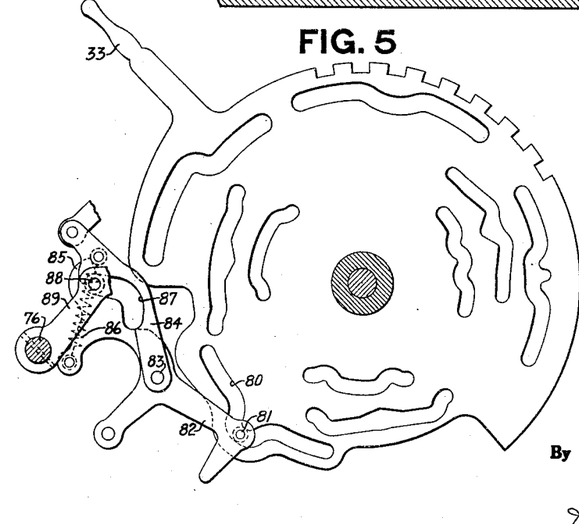
Fig. 5 shows the total control lever and a part of the mechanism adjusted thereby.

It is desired to lock the depressed transaction key 30 (Fig. 1), against release during the registration of items of a multiple-item transaction, and until the total thereof has been taken. Therefore, a locking mechanism is provided, which is under the control of the total control lever 33 (Fig. 5). This locking mechanism will now be described.

A releasing bar 70 (Fig. 1) supported at its upper end by an arm not shown, and at its lower end on an arm 72, is provided for adjusting the transaction key locking mechanism. The arm 72 which supports the releasing bar at its lower end, has a notch 73 formed in its outer periphery, adapted to co-operate with a bail 74 carried by a spring pulled arm 75, loosely mounted on a shaft 76, and retained in its normal position by a pin 77 carried by the differentially movable arm 50.

When one of the keys 30 (Fig. 1), which keys are used in registering multiple-item transactions, is depressed, the releasing bar 70 is cammed downwardly by the pin 41 on the key engaging an inclined edge 78 on the bar. This movement of the bar 70 rocks the arm 72 about its pivot a distance sufficient to bring the notch 73 opposite the bail 74.

It will be recalled that shortly after the beginning of the operation, the arm 50 is moved clockwise about its pivot. This movement of the arm 50 removes the pin 77 away from the arm 75, whereupon a spring 79 rocks the arm 75 counter-clockwise, and moves the bail 74 to the notch 73.

Then as the arm 50 returns to its normal position, as described above, the pin 77 will pass to the right of the arms 75. With the arm 75 in this position, the bail 74 is in the path of the arm 40, supporting the locking detent 38 at its lower end. This prevents the downward movement of the arm 40 and locks the detent 38 against movement, thus preventing release of the depressed key until the arm 75 is moved to restore the bail 74 to normal position, free of the notch 73. The restoration of the bail 74 is accomplished under the control of the total control lever 33 (Fig. 5) in a manner which will now be described.

After the last item of a multiple-item transaction has been entered, the machine is prepared for taking the total thereof by moving the total control lever 33 counter-clockwise (Fig. 5) from its "add" position to its "item-total" position. The total control lever 33 is provided with a slot 80 for giving an initial clockwise movement to the shaft 76 prior to a total-taking operation. Projecting into this slot 80 is a pin 81 carried on a lever 82, pivoted at 83. An arm 84 also pivoted at 83 is held in coactive relation with an upwardly extending arm 85 on the lever 82 by a spring 86 stretched between them. The arms 84 and 85 are shaped to form a cam slot 87, into which projects a pin 88, mounted in an arm 89, pinned on the shaft 76. The counter-clockwise movement of the lever 33 rocks the arm 82, and consequently the arms 84 and 85, counter-clockwise, which through the slot 87 and the pin 88 rocks the arm 89 and the shaft 76 slightly clockwise. This movement of the shaft 76 rocks an arm 90 (Fig. 1) pinned thereto, slightly clockwise. The arm 90 is adapted to co-operate with a pin 91, carried by the arm 75.

The arm 90 is moved to the position just described, before the machine is released for a total-taking operation. During total taking operations the main drive shaft 51 is given two rotations. Just before the second rotation of the shaft 51, during a total-taking operation, the shaft 76 receives an additional clockwise movement by mechanism hereinafter described. This second movement of the shaft 76 moves the arm 90 into contact with the pin 91 and rocks the arm 75 clockwise about its pivot. This clockwise movement of the arm 75 removes the bail 74 from the notch 73 in the arm 72 and positions the arm 75 in the path of the pin 77. As the arm 50 returns to its home position, near the end of a total-taking operation, the pin 77 engages the left side of the arm 75 and restores it to its normal position.

The shaft 76 is given its second clockwise movement by a cam groove 92 (Fig. 3), into which projects a roller 93 carried on a pitman 94. The roller 93 is normally held in a notch in the groove 92, and is withdrawn from its ineffective position in the notch, into an effective position in the groove by the above described movement of the total lever 33. The pitman 94 is guided by a stud 106 upon which the disk having the cam 92 is freely mounted. At its left hand end the pitman 94 is connected to a lever 107 pivoted on a stud supported in the side frame of the machine. At its opposite end the lever 107 is connected, by a link 108, to an arm 109 pinned to the shaft 76. The cam 92 receives one counter-clockwise rotation on a total-taking operation in a manner later to be described, which, through the mechanism just described, gives the shaft 76 its second clockwise movement.

*Cash drawer*

The machine is provided with a normally inaccessible drawer 110 (Figs. 2 and 4) released during each single-item operation and also during a total-taking operation.

The cash drawer is normally retained in its inaccessible position by a plunger 111 mounted in the base 112 of the machine, and held in its effective position by a spring 113 coiled about the plunger and compressed between a collar, supported by a pin 114 on the plunger, and the base of the machine. A collar 115, pinned to the plunger, limits the downward movement thereof. In the upper end of the plunger is a vertical slot within which a drawer plunger lever 116 freely operates. A pin 117, secured in the plunger, enters an elongated opening 118, formed in the drawer plunger lever. The opening in the drawer plunger lever 116 is elongated to allow the plunger to rise, when the cash drawer is closed, without moving the lever, and also to allow a greater movement of the lever than that required to lift the plunger. The lower end of the plunger 111 enters an opening in a bracket 119 secured on the back of the cash drawer to retain the cash drawer in the inaccessible position.

Figure 2:
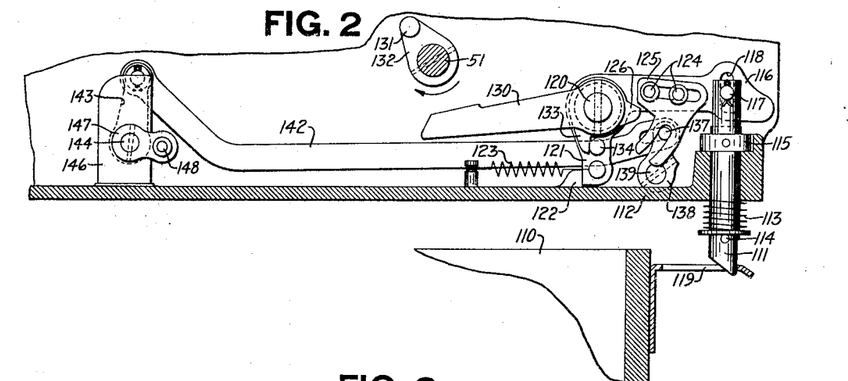
Fig. 2 is a detail view of the drawer release and controlling mechanism therefor.
Figure 4:
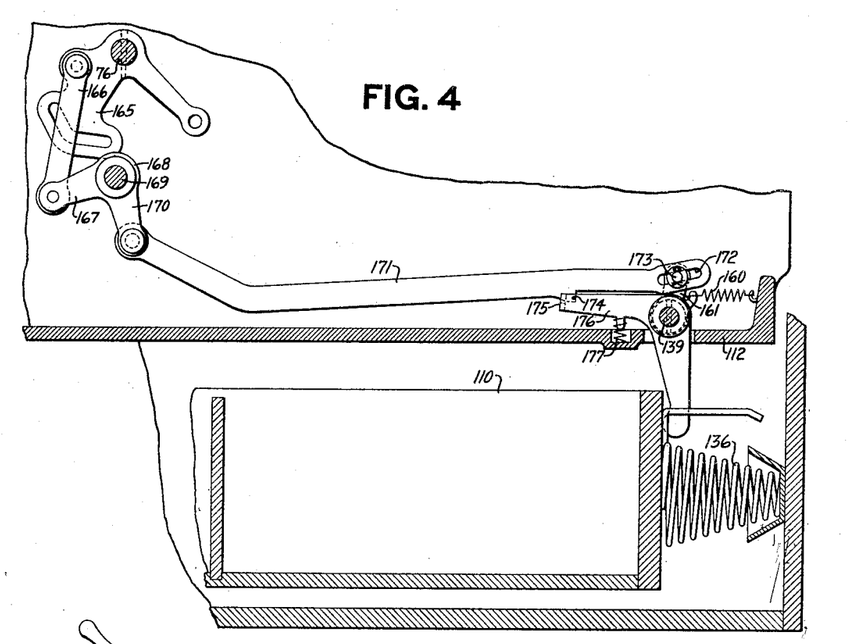
Fig. 4 is a section taken on line 4—4, of Fig. 6, looking in the direction of the arrow.

The drawer plunger lever 116 is pivoted on a shaft 120 and has a downwardly extending arm 121, normally held in contact with a lug 122, formed on the base 112, by a spring 123, attached to the arm 121 and to the base. Slidably mounted upon studs 124, carried by the lever 116 is a coupling link 125, adapted to co-operate with an operating arm 126 provided with a hub 127 (Fig. 6) pinned to the shaft 120, to operate the drawer plunger lever 116. Secured to the shaft 120, near the right hand side of the machine, is an arm 130 (Figs. 2 and 6) adapted to be in or out of co-operative position with a laterally projecting pin 131 carried by an arm 132 secured to the drive shaft 51. Referring to Fig. 2, the arm 130 is shown in its ineffective position with a downwardly extending finger 133 on the operating arm 126 contacting a pin 134 carried by the drawer plunger lever 116. When the parts are in the position shown in Fig. 2, the drawer releasing mechanism is in an ineffective position. As the coupling link 125 is moved toward the left, by mechanism to be described, the cam edge thereon contacts the operating arm 126 and moves the shaft 120 slightly clockwise, to shift the forward end of the arm 130 into the path of the pin 131 thus rendering the releasing means effective. As the shaft 51 rotates, during the operation of the machine, the arm 130 is moved counter-clockwise and, through its associated parts, withdraws the drawer plunger 111 from the opening in the bracket 119 to permit the drawer 110 to move into an accessible position, under the influence of a spring 136 (Fig. 4).

*Cash drawer control*

A beam 152, pivoted to the differential arm 50, is bifurcated to embrace a pin 153 in a link 154, the lower end of which is connected to an arm 155 pivoted on a shaft 156. Secured to the arm 155 is a segmental gear 157 meshing with a rack 158 rigid with a differentially shiftable bar 150 slidably mounted on studs 151. A roller 159 is mounted on the Y-shaped lever 54, previously described, to adjust the beam 152 in a manner well known in the art.

The left-hand end of the bar 150 (Fig. 1) has a cam slot embracing a roller 148 carried by an arm 147 fast on a shaft 144 journaled in brackets 145 and 146 seated on the base 112 of the machine. When the bar 150 is moved to the left, under control of one of the keys 30, from the position shown in Fig. 1, the contour of the cam slot 149 operating on the roller 148, rocks the arm 147 and its shaft 144 clockwise from the position shown in Fig. 1 to the position shown in Fig. 2. A link 142 pivotally connected at one end to an arm 143 secured to the left-hand end of the shaft 144 (Fig. 6) is attached at its opposite end by a pin and slot connection 137, (Fig. 2), to an arm 138 fast on a shaft 139. The pin 137, extending through the arm 138, enters a slot in the coupling link 125.

Figure 1:
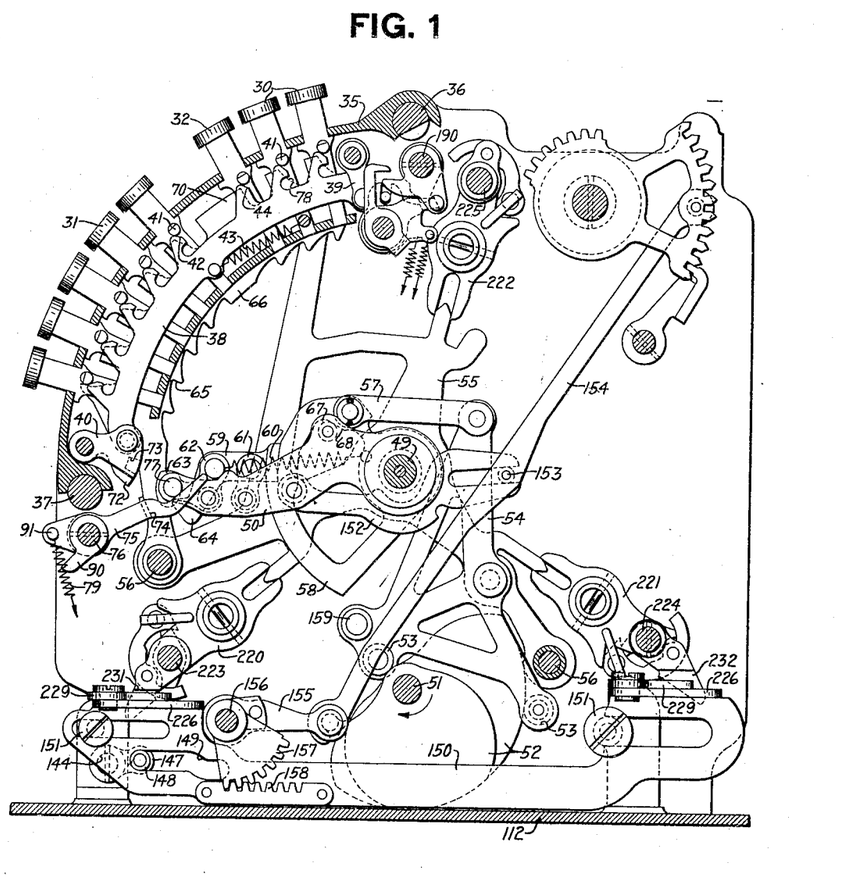
Fig. 1 is a transverse section through the machine showing the bank of transaction keys and the associated differential mechanism.

The arm 147 in its clockwise movement from the position in Fig. 1 operates through the shaft 144 and arm 143, to move the link 142 to the position shown in Fig. 2, thus permitting the coupling link 125 to assume its right-hand position, under the influence of the spring 160 (Fig. 4) stretched between a flange on the base and a hook on an arm 161 secured to the shaft 139. This spring 160 tends, at all times, to rock the shaft 139 clockwise, thus maintaining the coupling link 125 in the position shown in Fig. 2, whenever the differentially shiftable bar 150 has been set under the control of any of the multiple-item keys 30.

With the coupling link 125 held in the position shown in Fig. 2, the arm 130 remains out of the path of the pin 131, and the drawer will not be opened at the end of the operation of the machine when entering an item of a mutliple-item transaction.

At the end of an operation, wherein an item of a multiple-item transaction is registered in the machine, due to the beam construction, which construction allows the differentially shiftable bar 150 to remain in the position to which it was set at the end of an operation, the roller 148 will be in the lower section of the cam slot 149, and the parts shown in Fig. 2 will remain in those positions wherein the arm 130 is in its ineffective position.

However, when a total is taken, it is, of course, desired that the cash drawer be made accessible, and therefore, mechanism is provided, under the control of the total lever 33, to render the arm 130 effective on total taking operations to operate the plunger 111 to release the drawer.

When the total lever 33 (Fig. 5) is moved from its "add" to its "item-total" position, an initial clockwise movement is given the shaft 76 (Figs. 4 and 5). Secured to this shaft 76, near its left-hand end, is an arm 165 (Fig. 4) connected by a link 166 to one arm 167 of a bell crank 168 pivoted upon a rod 169. The other arm 170 of the bell crank is connected to a link 171 having at its other end a slot 172 through which projects a pin 173 on the arm 161.

The initial movement of the shaft 76, through the mechansim just described, moves the link 171 to the left, but due to the slot 172, no movement is imparted at this time to the arm 161. However, during total taking operations, the shaft 76, in a manner to be hereinafter described, receives an additional clockwise movement, at which time, the right-hand end of the slot 172, being in engagement with the pin 173, rocks the arm 161 counter-clockwise, thus rocking the shaft 139, and arm 138 likewise, whereby the pin 137 moves the coupling link 125 to the left (Fig. 2) into contact with the arm 126, thus rocking that arm and the operating arm 130 clockwise, whereby the latter arm is moved into the path of the pin 131, thus rendering the drawer releasing mechanism effective so that, upon operation of the drive shaft 51, the arm 130 is rocked counter-clockwise, and as the coupling 125 is in contact with the arm 126, the drawer plunger lever 116 is operated and withdraws the plunger 111 to release the drawer during the second cycle of the total-taking operation.

During the above counter-clockwise movement of the arm 138, the link 142 is not moved by the pin 137 due to the slot in the right-hand end of the link 142 into which the pin 137 projects.

As the parts are restored to their normal positions during the second cycle of the total-taking operations, the shaft 76 moves the link 171 to the right, thus permitting the spring 160 to rock the arm 161, shaft 139 and arm 138 clockwise, and the pin 137 moves the coupling link 125 from contact with the arm 126 back to the position shown in Fig. 2, allowing the arm 130 to again assume an ineffective position.

At the end of the above described total-taking operation the differentially shiftable bar, as above mentioned, is left in the position wherein the roller 148 occupies the lower section of the cam slot 149.

Now, assume that one of the single-item keys 31 is depressed, and the machine operated for the entry of a single-item transaction. During the operation, the beam 152, through the differential arm 50, and roller 159, will raise the link 154, thus rocking the arm 155 and segmental gear 157 counter-clockwise to move the bar 150 toward the right (Fig. 1) whereupon the roller 148 will be moved into the upper section of the cam slot 149, thus rocking the arm 147, and shaft 144 from the position shown in Fig. 2 to the position shown in Fig. 1. This counter-clockwise movement of the arm 147 through the arm 143, link 142, and pin 137, rocks the arm 138 counter-clockwise (Fig. 2) thereby sliding the coupling link 125 to the left, causing it to cam the arm 126, and consequently, the arm 130 clockwise to move the arm 130 from an ineffective to an effective position in the path of the pin 131. Now, as the drive shaft 51 continues its operation, the pin 131, by its contact with the arm 130, raises the drawer plunger lever 116, withdrawing the plunger 111 from the drawer latch and the drawer is opened at the end of a single-item transaction.

At the end of a single-item transaction, due to the fact that bar 150 (Fig. 1) is held in the position into which it was set under control of one of the single-item keys 31, the roller 148 is maintained in the upper section of the cam slot 149, thus holding the link 142 (Fig. 2) in its moved position, and maintaining the coupling link 125 in contact with the arm 126, so that the operating arm 130 is left in an effective position at the end of a single-item transaction.

Interlock

An interlock is provided, whereby it is necessary to close the cash drawer before the total lever can be returned to its add position. When the total control lever 33 is moved from its "add" position to any of the total-taking positions and the shaft 76 receives its initial movement, a shoulder 174 formed on the link 171 passes to the left of a lip 175 on a bell crank lever 176, pivoted on the shaft 139, and normally held in engagement with the cash drawer 110, by a spring 177. As the cash drawer moves forwardly, the bell crank lever is moved clockwise by the spring 177, thus moving the lip 175 behind the shoulder 174 on the link 171, in which position the total control lever 33 cannot be returned to the "add" position, making it necessary to return the cash drawer to its normal inaccessible position before entering further items.

Operating mechanism

The machine is manually operated by a crank 180 (Fig. 3) connected to a gear 181 meshing with a gear 182, pivoted on the stud 106. The gear 182 meshes with a gear 183 pinned to the main drive shaft 51. The ratio of these gears is such that two clockwise movements of the crank will impart one-half of one counter-clockwise rotation to the gear 182 and one complete clockwise rotation to the gear 183.

The machine is released for operation by depressing a clerk's key (not shown), a transaction key 30 or 31 (Fig. 3) and the starting bar 34. This permits a release shaft 190 to be rocked clockwise to release the machine for operation in a manner fully illustrated and described in the previously mentioned application.

The shaft 190 normally tends to rock clockwise under the influence of a spring 191 compressed between the bottom of a slot in a link 192 and a shoulder on each of two identical spring pilots 193 pivoted on an arm 194 pinned to the shaft 190. Also pinned to the shaft 190 is an arm 195, having a flattened stud 196. A pawl 197, pivoted on a stud mounted in the side frame 198 of the machine, normally lies in the path of the stud 196, thereby holding the shaft 190 in normal position. Depressing the starting bar 34 will, through a stud 199, on a plate 200, engaging a bifurcated arm 201, connected by a link 202 to a downwardly extending arm 203 of the pawl 197, rock the pawl counter-clockwise out of the path of the flattened stud 196, whereupon the spring 191 expands and rocks the shaft 190 clockwise to release the machine.

Near the end of each operation, it is necessary to restore the shaft 190 to its normal position, and also to restore the pawl 197 to its normal position in the path of the flattened stud 196.

The mechanism for restoring these parts to their respective normal positions is shown in Fig. 3, and includes a cam groove 205 cut in the face of the gear 182 and into which projects a roller 206 carried by an arm 207 pivoted on a stud supported by the side frame 198 of the machine. At its right hand end the arm 207 carries a pin 208 projecting into a notch in an opening 209 in the link 192 previously mentioned. The cam groove 205 is shaped to rock the arm 207 clockwise and back to its normal position near the end of each operation of the machine. It will be recalled, that at the beginning of the operation the arm 194 is rocked clockwise by the spring 191, which positions the stud, carried by this arm, in the top of a slot in the link 192. The clockwise movement of the arm 207, as just described will, through the pin 208, link 192 and arm 194, rock the shaft 190 counter-clockwise slightly past normal, whereupon the starting bar 34, pulled by a spring 210, returns to its normal position, which through mechanism hereinbefore described, restores the pawl 197 to its position in the path of the stud 196. The shaft 190 then rocks clockwise until the stud 196 rests against the pawl, in which position the parts are ready to be released for another operation.

On total-taking operations, the machine receives two complete cycles of movement, and it is necessary to prevent restoration of the parts just described to their normal positions near the end of the first cycle. Mechanism provided therefor will now be described.

Referring to Figs. 3 and 5, it will be remembered that the shaft 76 is given a preliminary clockwise movement when the total control lever 33 (Fig. 5) is moved to prepare the machine for a total-taking operation. This movement of the shaft 76, through the arm 109 (Fig. 3), link 108 and lever 107, moves the pitman 94 to the left a distance sufficient to remove the roller 93 thereon from the notch, in which it normally rests, into effective relation with the cam groove 92. This initial movement of the pitman 94 also moves a slide 211 to couple the disk, containing the groove 92, and gear 182 together in such a manner that they will be rotated in unison. At its right hand end, the pitman 94 is provided with a stud 212, co-operating with a slot 213 formed in the lower end of the link 192. During the first cycle of movement of a total-taking operation, the cam groove 92 gives the pitman 94 an additional movement to the left, which by means of the stud 212, will rock the link 192 clockwise and position the lower end of the opening 209 therein so as to render the pin 208 ineffective on its downward movement and therefore, the shaft 190 will not be rocked at this time. During the second cycle the link 192 is restored to its effective position and the shaft 190 will be restored, as described above.

Totalizers

Figure 6:
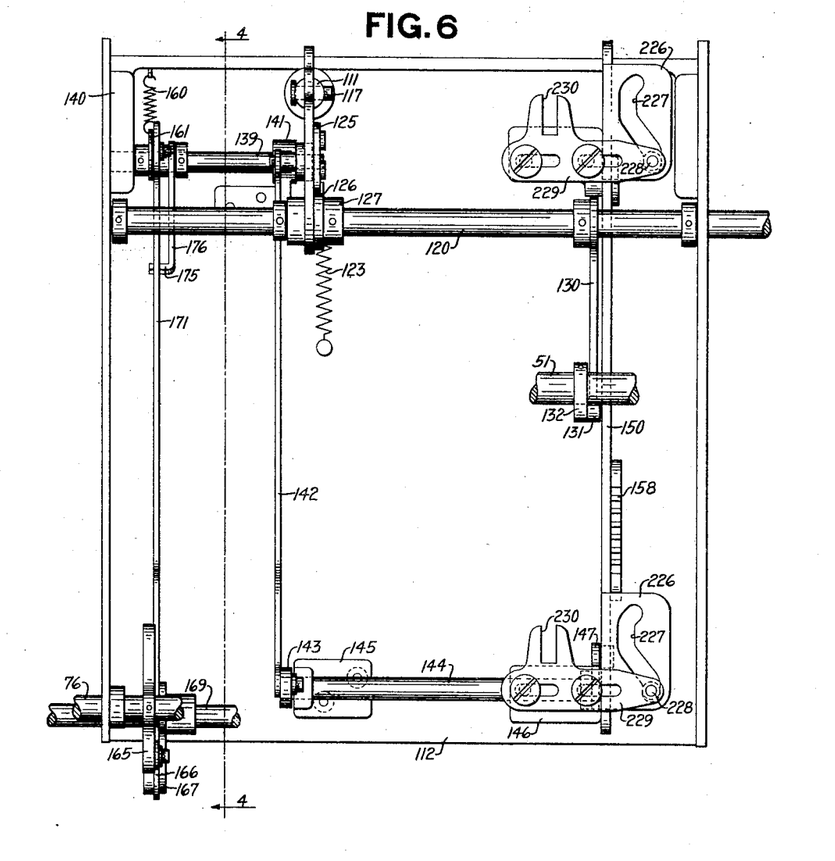
Fig. 6 is a top plan view of the drawer control and drawer release mechanism.

The machine is provided with a plurality of totalizers mounted in three frames 220, 221 and 222, (Fig. 1) mounted on shafts 223, 224 and 225, respectively. The totalizer frames 220 and 221 are slidable laterally in the machine to select the transaction and classification totalizers mounted thereon. The upper totalizer frame 222 carries a grand totalizer which is not under the control of the transaction keys. To select a totalizer there is provided the following mechanism:

As described above, the differentially shiftable bar 150 (Fig. 1) is adjusted differentially under control of the transaction keys 30 and 31. This bar 150 has a bent-over flange 226, at each end thereof, in which is formed a cam slot 227 (Fig. 6). Projecting into the cam slots 227 are studs 228 carried by slides 229. The slides 229 have formed therein slots 230 into which project downwardly extending arms 231 and 232 (Fig. 1) of the totalizer frames 220 and 221. As the bar 150 is adjusted, during the operation of the machine, the cam slots 227 are shaped to move the slides 229 and the totalizer frames 220 and 221 laterally in the machine to select the totalizers, commensurate with the transaction key depressed.

While the forms of mechanisms herein shown and described are admirably adapted to fulfill the objects primarily stated, it is to be understood that it is not intended to confine the invention to the forms or embodiment herein disclosed, for it is susceptible of embodiment in various forms all coming within the scope of the claims which follow.

What is claimed is:

1. In a machine of the class described, the combination of a plurality of multiple-item transaction keys, a money receptacle having an accessible position, and an inaccessible position, means for retaining said money receptacle in the inaccessible position, means for releasing said retaining means and a differentially slidable means for disabling said releasing means when anyone of said multiple-item transaction keys is in operated position.

2. In a machine of the class described, the combination of a multiple-item transaction key, a money receptacle having an accessible position and an inaccessible position, means for retaining said money receptacle in the inaccessible position, means for releasing said retaining means, means for disabling said releasing means when said multiple-item transaction key is in operated position, and manipulative means rendering said disabling means ineffective.

3. In a machine of the class described, the combination of a single-item transaction key, a multiple-item transaction key, a manipulative lever having an adding position and a totalizing position, a money receptacle having an accessible position and an inaccessible position, means for retaining said money receptacle in the inaccessible position, means for releasing said retaining means, means for disabling said releasing means when said multiple-item transaction key is operated, means for enabling said releasing means to function when said manipulative lever is moved to the totalizing position, and means for operating said releasing means.

4. In a machine of the class described, the combination of a single-item transaction key, a multiple-item transaction key, a manipulative lever having a normal position and an operated position, a money receptacle, a money receptacle releasing means, and means intermediate said manipulative lever and said releasing means for rendering said releasing means active when said multiple-item transaction key is operated and said manipulative lever is in operated position.

5. In a machine of the class described, means controlling the machine to perform operations of one or two cycles, a single-item transaction key, a multiple-item transaction key, a money receptacle normally inaccessible and also inaccessible during each one-cycle operation with the multiple-item transaction key depressed, and means for rendering said receptacle accessible during the second cycle of a two-cycle operation.

6. In a machine of the class described, the combination of an operating means to perform operations of one or two cycles, a single-item transaction key, a multiple-item transaction key, a control lever normally in an adding position adapted to be moved to a total position, a rocking member operated at each cycle of operation, a second rocking member inoperable when a multiple-item transaction key is depressed, a latch member adapted to be actuated by said second rocking member, a cash drawer normally held in an inaccessible position by said latch member, a movable member carried by said second rocking member, and means controlled by said control lever to move said movable member to a cooperating position with said first rocking member during the second cycle of operation to operate said latch member and release said cash drawer from its inaccessible position.

7. The combination of a drawer releasing mechanism, a differentially movable actuator for controlling said releasing mechanism, and an add and total control means for controlling said releasing means independently of said actuator.

8. In a machine capable of accumulating and total-taking operations, the combination of a drawer releasing mechanism, an add and total control means, a bank of keys, means for controlling said releasing mechanism from said bank of keys during accumulating operations, and means for controlling said releasing means from said control means during total-taking operations.

9. The combination of a drawer releasing mechanism, an add and total control lever, a bank of keys for controlling the effectiveness of the drawer releasing mechanism when said lever controls the machine for adding operations, and means controlled by said lever for rendering the drawer releasing mechanism effective when said lever controls the machine for totaling operations.

10. The combination of a drawer releasing mechanism, a sliding coupling member for rendering said mechanism active to effect release of the drawer, a bank of keys for controlling the position of said member, and an adjustable add and total control lever adapted in its total control position to control the position of said sliding member irrespective of the control of said bank of keys.

11. The combination of a drawer releasing mechanism, a movable coupling member for rendering said mechanism active to effect release of the drawer, a bank of keys for controlling the position of said member, and an adjustable add and total control lever adapted in its total control position to control the position of said movable member irrespective of the control of said bank of keys.

12. In a machine capable of accumulating items and of printing totals, a drawer releasing mechanism operable during item accumulating and total printing operations, and means for compelling closing of the drawer prior to an accumulation of items subsequent to a total printing operation.

13. In a machine capable of accumulating items and of printing totals, a drawer releasing mechanism operable during item accumulating and total printing operations, means for compelling closing of the drawer prior to an accumulation of items subsequent to a total printing operation but ineffective subsequent to an item accumulating operation.

14. In a machine adapted to enter single-item transactions and multiple-item transactions, the combination of a single-item transaction key; a multiple-item transaction key; a main operating device; a money receptacle; means to retain the money receptacle inaccessible; money receptacle releasing means connected with the retaining means, said money receptacle releasing means being in an ineffective position, relative to the main operating device, at the completion of a multiple-item transaction; coupling means controlled by the single-item transaction key to render the releasing means effective, said coupling means adapted to maintain the releasing means effective at the end of a single-item transaction; and means to restore the single-item keys to normal at the end of such single-item transaction operation.

15. In a machine adapted to enter single-item transactions and multiple-item transactions, the combination of a single-item transaction key; a multiple-item transaction key; a main operating device; a money receptacle; means to retain the money receptacle inaccessible; money receptacle releasing means, occupying an effective position, relative to the main operating device, at the completion of a single-item transaction; and coupling means controlled by the multiple-item key to render the releasing means ineffective.

16. In a machine adapted to enter single-item transactions and multiple-item transactions, the combination of groups of depressible keys; a common differential mechanism cooperating with said keys; a main operating device; a money receptacle; a money receptacle retaining device; and shiftable coupling means intermediate the differential mechanism and the money receptacle retaining device, adjustable under the control of one group of keys to a position to enable the main operating device to operate the retaining means to release the money receptacle, and adjustable under control of another group of keys to prevent operation of the retaining means.

17. The combination of a drawer releasing mechanism; a sliding coupling member to render the releasing mechanism effective to release the drawer, the coupling member having only two positions of adjustment, one being the coupled position and the other the uncoupled position; a bank of keys, a plurality of which control the coupling member to cause it to assume one of its positions of adjustment, and certain others of which keys control the coupling member to cause it to assume the other of its positions of adjustment; and an adjustable lever for controlling said coupling member to cause it to assume one of said positions of adjustment.

18. The combination of a drawer releasing mechanism; a movable coupling member for rendering said releasing mechanism effective to release the drawer, said coupling member having only two positions of adjustment, one being the coupled position and the other the uncoupled position; and a bank of keyes, one of which controls the coupling member to cause it to assume one of its positions of adjustment, and another of which controls the coupling means to cause it to assume the other of its positions of adjustment; and an adjustable lever for controlling the member to cause it to assume one of its positions of adjustment.

19. In a machine capable of accumulating and recording single-item transactions and multiple-item transactions, the combination of drawer releasing mechanism, and means for controlling the drawer releasing mechanism to render the same ineffective during the entry of the several items of a multiple-item transaction and effective upon the taking of the total of the several items and also upon the entry of a single-item transaction.

20. In a machine capable of accumulating and recording single-item transactions and multiple-item transactions, the combination of a money receptacle having an accessible position and an inaccessible position, means for retaining said money receptacle in its inaccessible position, means for releasing said retaining means, means for rendering the releasing means ineffective upon the entry of the items of a multiple-item transaction, and means for rendering the releasing means effective upon taking the total of the several items and upon the entry of a single-item transaction.

21. In a machine capable of entering single-item transactions and multiple-item transactions; a normally inaccessible cash drawer; means to retain the cash drawer in its inaccessible position, said retaining means being effective during the entry of the several items of the multiple-item transaction; a single-item key operable as a preliminary to the entry of a single-item transaction, and means controlled by the single-item key for rendering the retaining means ineffective.

22. In a machine adapted to enter multiple-item transactions and single-item transactions, the combination of a money receptacle having an accessible position and an inaccessible position, means for retaining the money receptacle in the inaccessible position, means for releasing said retaining means, means for preventing said releasing means from functioning when entering items of a multiple-item transaction, and manipulative means operable as a preliminary to the entry of a single-item transaction for rendering the releasing means effective.

23. In a machine adapted to enter multiple-item transactions and single-item transactions, the combination of a main operating mechanism, a member driven by said main operating mechanism, a money receptacle, a latch therefor to retain the same in an inaccessible position, means to operate said latch to release the money receptacle, a rockable member intermediate said driven member and said latch operating means, means operable during the entry of the items of a multiple-item transaction to hold said rockable member out of cooperative relation with said driven member to prevent operation of said latch, and means operable upon the entry of a single-item transaction to move said rockable member into cooperative relation with said driven member whereby the rockable member is actuated to operate the latch operating means.

24. In a machine adapted to enter single-item transactions and record the totals thereof, and to enter multiple-item transactions and record the total of the several items of said multiple-item transactions; the combination of an operating member operable both during item-entering and total recording operations; a money receptacle having an accessible position and an inaccessible position; a money receptacle releasing means; a device adapted to be operated by said operating member to operate the releasing means to release said receptacle from its inaccessible position, said device being held in an ineffective position during the entry of the several items of a multiple-item transaction; and means operable, upon recording the total of said several items of a multiple-item transaction, upon the entry of a single item, and upon recording the totals of single-item transactions, to move said device into an effective position.

25. In a machine adapted to record single-item transactions, multiple-item transactions and print the total thereof; the combination of an operating member operable both during item entering and total printing operations; a normally inaccessible cash receptacle; a latch for holding the receptacle inaccessible; connections intermediate the operating member and the latch; and means effective only upon single-item printing operations and total printing operations to render the cash receptacle accessible.

26. In a machine capable of entering single-item transactions and multiple-item transactions and recording the total of the latter; the combination of an operating member operable during the entry of single-item transactions, during the entry of the several items of multiple-item transactions, and during the recording of the total of the latter; a normally inaccessible cash receptacle; means to retain the cash receptacle in its inaccessible position; a device adapted to operate the retaining means to render the cash drawer accessible; and means operable during the entry of the several items of multiple-item transactions for rendering said device ineffective, and operable during the recording of the total of said items, and also during the entry of single-item transactions for rendering said device effective.

In testimony whereof I affix my signature.

BERNIS M. SHIPLEY.